(No Model.) 2 Sheets—Sheet 1.
L. DARE.
HARNESS SADDLE.
No. 303,494. Patented Aug. 12, 1884.
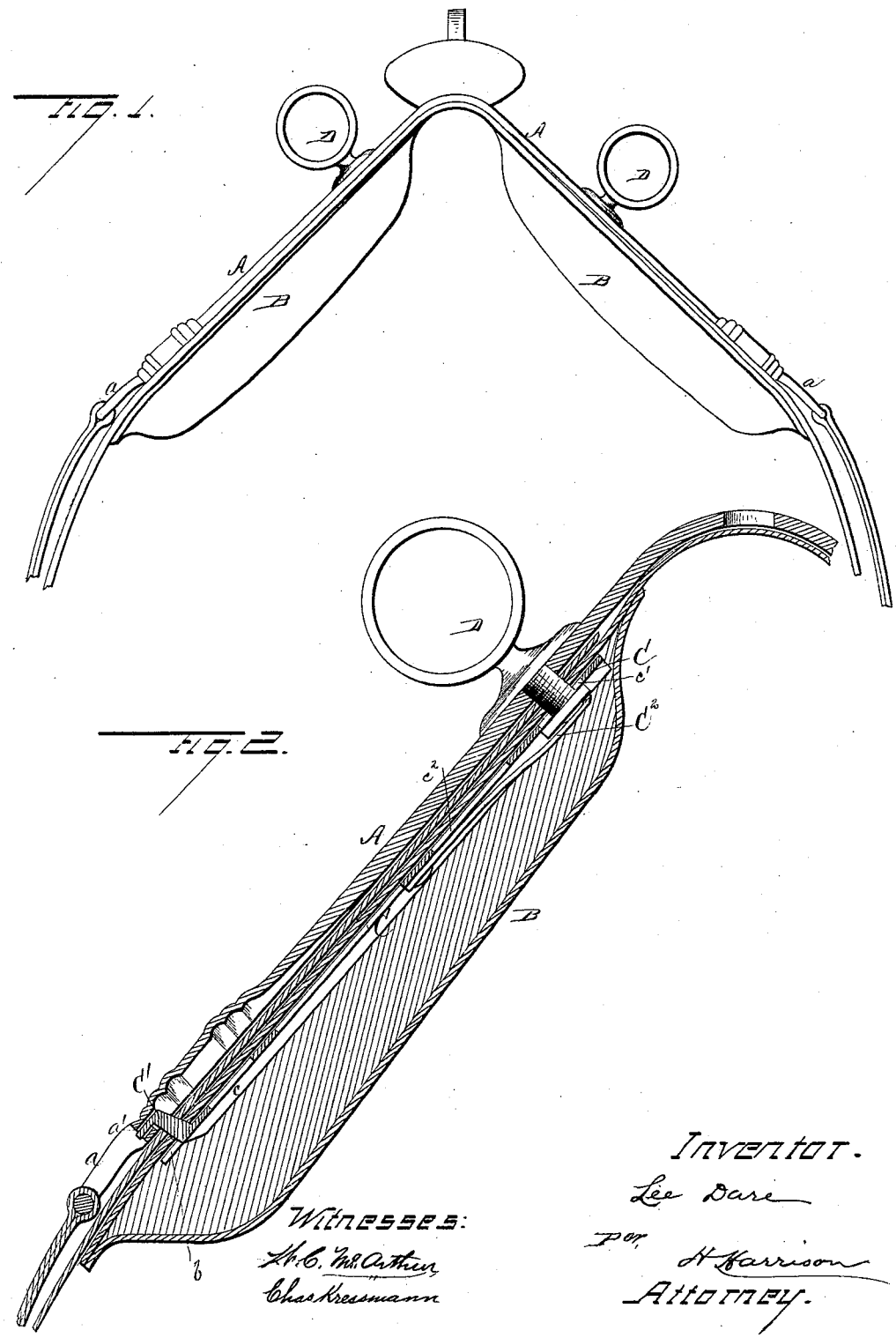

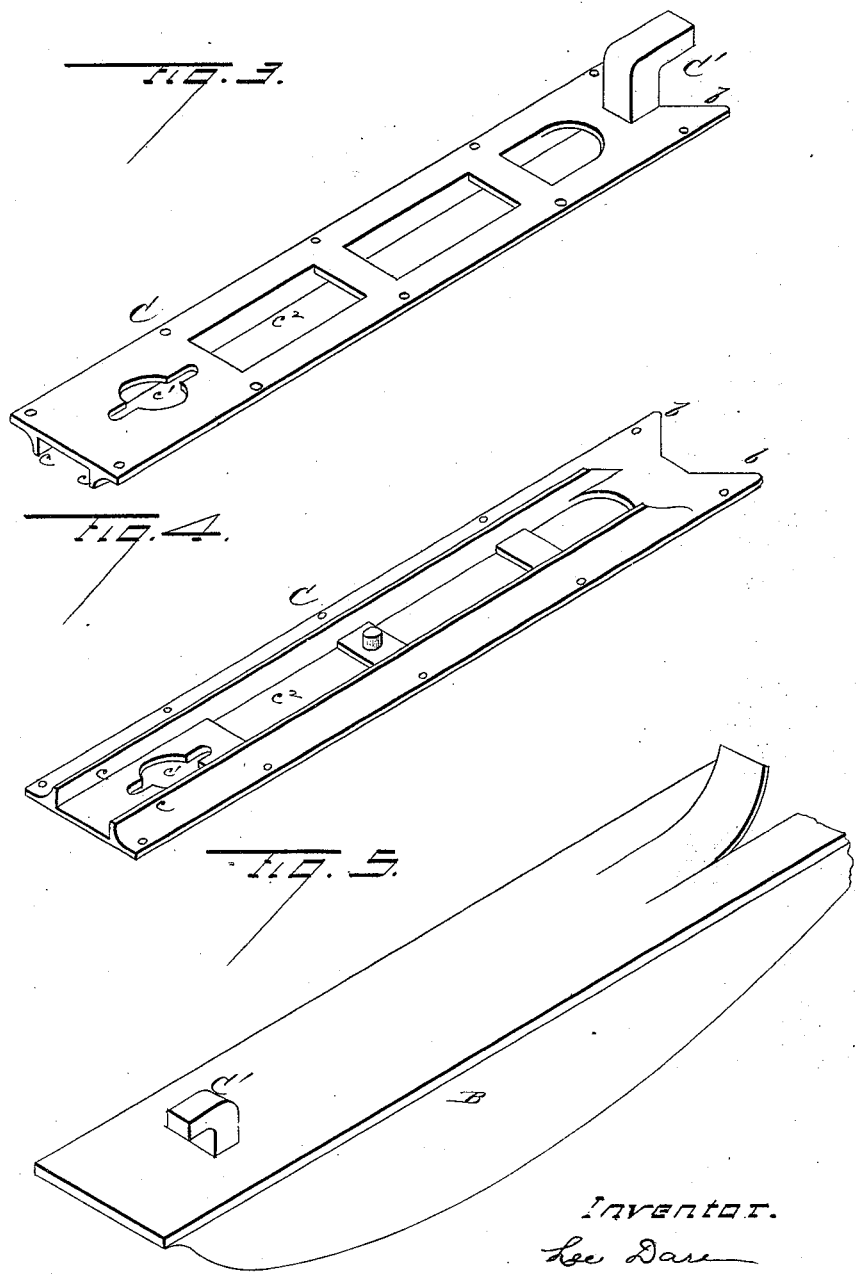

UNITED STATES PATENT OFFICE.

LEE DARE, OF LA GRO, INDIANA.

HARNESS-SADDLE.

SPECIFICATION forming part of Letters Patent No. 303,494, dated August 12, 1884.

Application filed September 26, 1883. (No model.)

*To all whom it may concern:*

Be it known that I, LEE DARE, a citizen of the United States, residing at La Gro, in the county of Wabash and State of Indiana, have invented certain new and useful Improvements in Harness-Saddles, of which the following is a specification, to wit:

This invention relates to an improvement "harness-saddles;" and it consists in certain novel details of construction and arrangement, whereby it is simplified, cheapened, and rendered more durable, substantially as will be hereinafter more fully set forth.

In order to enable others skilled in the art to which my invention appertains to make and use the same, I will now proceed to describe its construction, referring to the accompanying drawings, in which—

Figure 1 is a rear elevation. Fig. 2 is an enlarged vertical section of one side of the saddle. Fig. 3 is a perspective view of the saddle-iron. Fig. 4 is a similar bottom view of the same, and Fig. 5 is a perspective view of the pad.

A represents a harness-saddle tree, having a loop, $a$, at each end, and just at the inner side of this loop, on the under side, is a bar, $a'$, the purpose of which will be presently seen, the whole tree, loops, and bars being cast entire in one piece, as shown.

B represents the pad, of the usual shape, within which, just beneath its outer cover, is placed an iron, C, formed with a hook, C', upon its outer or lower end, which projects through the outer cover of the pad and engages with the bar $a'$ upon the end of the tree. The iron C is formed upon its under side with two longitudinal flanges, $c\ c$, and at its upper end with an opening, $c'$, for the passage of the shank of the terret-ring, whose nut is held beneath this opening by the flanges $c\ c$, and also by a flat spring, $C^2$, secured at one end to the iron C, and its other end lying beneath the terret-nut, as shown in Fig. 2. The iron C is also formed a short distance from the hole $c'$ with an opening, $c^2$, of sufficient size to admit the passage of the nut, and just over this the pad-cover is slit to form a tongue, as shown by Fig. 5.

To prevent the strain of the skirt $d$ from breaking down the ends of the pad, as is frequently the case, I form the lower ends of the iron C beyond their hooks C' with one or more projections, $b$, which serve to sustain the end of the pad and obviate this difficulty. The skirt is secured in place both by the hook C' and the terret-ring D, and when the saddle is to be put together the ends of the hooks C' are engaged with the bars $a'$ and the upper ends of the pads brought closely beneath the arch of the tree and secured by the terret-ring, making a secure and durable saddle, which is very quickly taken apart for cleaning or oiling the harness.

The peculiar form of the irons C enables me to put up these saddles and supply them to the trade unmounted, (without the terret-rings and check-rein hook,) and allows the dealer to mount them in any style to suit the buyer. When this is determined, the nut is passed through the slit in the pad and opening $c^2$ in the iron C, and pushed forward to its position, where it is securely held by the spring $C^2$.

It is obvious that, if desired, the hooks C may have their ends turned in instead of out, with the same effect.

Having thus fully described my invention, what I claim as new, and desire to secure by Letters Patent, is—

1. In a harness-saddle, the iron C, cast with the hook C' on one end, and provided with the spring $C^2$, flanges $c\ c$, hole $c'$, and opening $c^2$, substantially as and for the purpose set forth.

2. In a harness-saddle, the iron C, formed with the hook C' and one or more projections or toes, $b\ b$, substantially as and for the purpose described.

3. In a harness-saddle, the pad B, provided with the iron C, formed as herein described, in combination with the tree A, having the loops $a$ and bars $a'$, all cast in one piece, and the terret and its nut, substantially as described and shown, and for the purpose set forth.

In testimony whereof I affix my signature in presence of two witnesses.

LEE DARE.

Witnesses:
 THOS. R. PORTER,
 L. P. MURPHY.